(No Model.)
W. P. WILLIAMS.
BARREL TRUCK.
No. 345,467. Patented July 13, 1886.
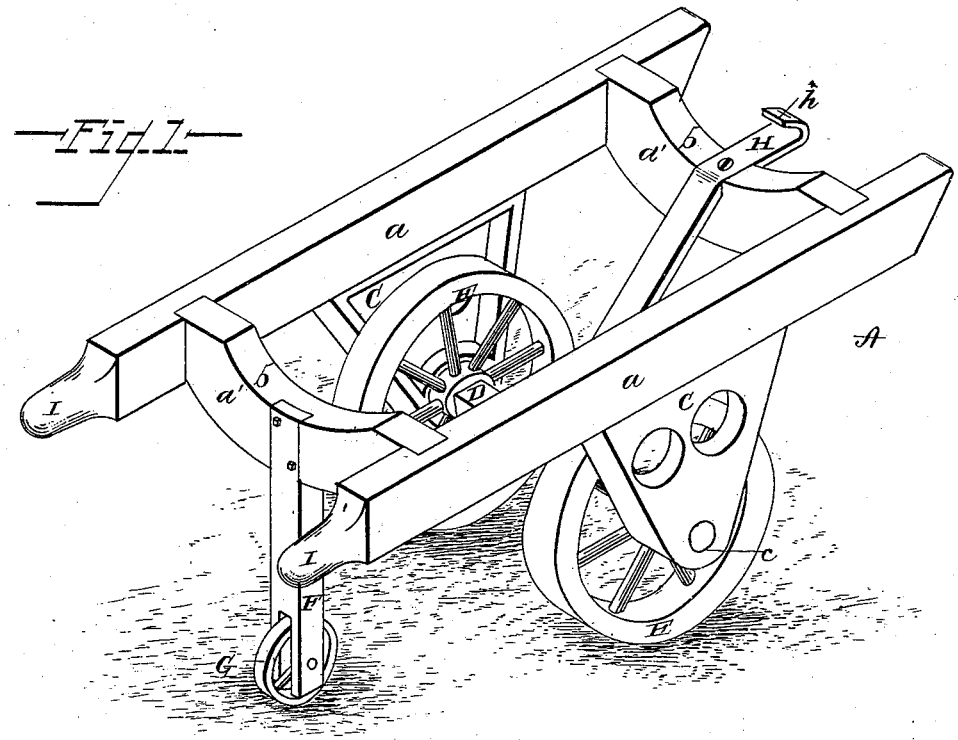
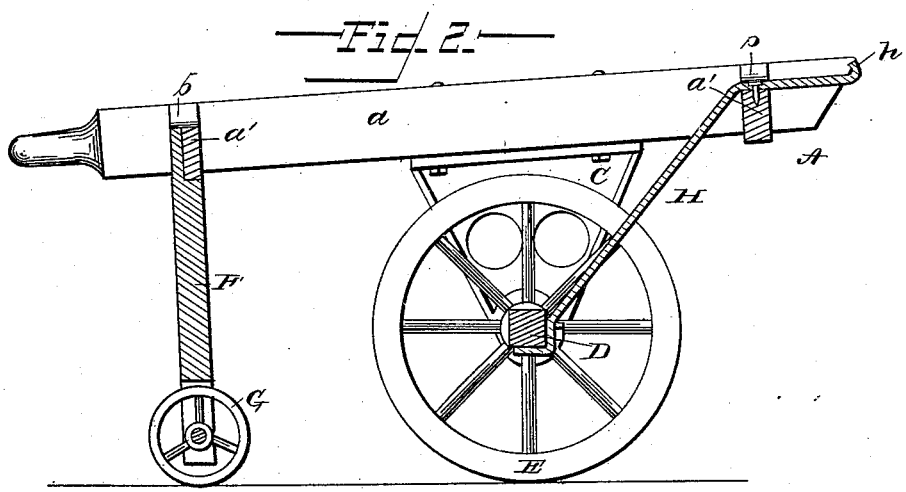
Witnesses
James M. Hilton
W. F. Bernhard
Inventor
Wm. P. Williams
By his Attorneys
C. A. Snowden

UNITED STATES PATENT OFFICE.

WILLIAM PRESTON WILLIAMS, OF BARTLETT, TEXAS.

BARREL-TRUCK.

SPECIFICATION forming part of Letters Patent No. 345,467, dated July 13, 1886.

Application filed April 24, 1886. Serial No. 200,020. (No model.)

*To all whom it may concern:*

Be it known that I, WILLIAM PRESTON WILLIAMS, a citizen of the United States, residing at Bartlett, in the county of Williamson and State of Texas, have invented a new and useful Improvement in Barrel-Racks, of which the following is a specification.

My invention relates to improvements in barrel racks or trucks; and it consists of the peculiar and novel construction and combination of parts, substantially as hereinafter fully set forth, and particularly pointed out in the claim.

The object of my invention is to provide an improved barrel rack or truck which can be conveniently and easily loaded and transported from place to place; to provide means for assisting in loading the barrel or receptacle on the truck and for retaining the same on the truck against danger of accidental displacement while the truck and its contents are being moved or transported, and to provide an improved truck which shall be very simple, strong, and durable in construction, thoroughly effective in operation, and cheap and inexpensive of manufacture.

In the accompanying drawings, Figure 1 is a perspective view of a barrel truck or rack embodying my invention. Fig. 2 is a vertical longitudinal sectional view through the truck on the line $x\,x$ of Fig. 1.

Referring to the drawings, in which like letters of reference denote corresponding parts in all the figures, A designates the frame of my improved barrel truck or rack, which comprises the parallel side rails or bars, $a$, and the transverse connecting bars or rails $a'$ at the ends of the side rails, the whole of which are suitably secured very firmly and rigidly together in any suitable manner. The end bars or rails of the truck-frame are provided with recessed or cut-out portions $b$ on their upper edges, in which the barrel or other like receptacle is to be supported and fitted, and by which the barrel is retained in place while the truck is in motion or at rest.

C designates hangers, which are secured to the side rails of the main frame A of the truck, and which depend downwardly therefrom at or near the middle thereof, and the lower ends of these hangers are provided with bearings $c$, which receive the ends of a carrying shaft or axle, D, that is journaled and suspended therein, and provided with carrying-wheels E, that are suitably retained on the axle, and without any play or movement thereon, by devices of any suitable character to render the apparatus steady when in motion.

F designates a standard that is secured rigidly to one end of the frame A, and which depends downwardly therefrom, and the lower end of this standard carries a caster-wheel, G, that is suitably journaled between the bifurcated end of the said standard, and this caster-wheel and standard serve to relieve the weight and strain of the load on the truck from the operator or attendant, who pushes the apparatus along, the caster-wheel rolling along the ground about on the plane of the carrying-wheels of the truck.

H designates a bar that is secured at one end to the axle or shaft of the truck, and which passes over and is secured to one of the transverse rails or bars of the frame, and the outer free end of this bar is extended beyond the frame A and bent to form a hook or claw, $h$, that is adapted to take under and assist in raising a barrel on the truck or in loading the latter.

The operation of my invention is as follows: To load my improved truck with a barrel or other like article it is turned to a vertical position, or approximately so, and adjusted near to the object that is to be carried thereon, and the hook or claw is then inserted under the edge of the barrel and the latter drawn over upon the frame, after which the truck is turned to a horizontal position, so that the caster-wheel rests and rolls along the ground, and serves to support the weight of the load and relieve the attendant of the same. The barrel is to remain on the truck until the contents thereof have been emptied, thus adapting the truck for use as a rack, after which the barrel is removed; or the device can be used as a truck around the store for moving various other heavy articles.

My improved barrel truck or rack is especially adapted for use around grocery or other stores where it is desirable to transport heavy articles, and the device is very simple and strong in construction and comparatively cheap of manufacture. The truck is a very convenient article, and it relieves the operator of the weight of the load, which is an important consideration in this class of devices.

The frame A is provided at the end at which the standard and its caster-wheel are located with projecting handles I, which are suitably secured thereto, and thus adapt the truck or rack to be conveniently manipulated by hand.

Having thus fully described my invention, what I claim as new, and desire to secure by Letters Patent, is—

In a portable barrel truck or rack, the combination of the frame having the recessed end rails and the handles, the hangers secured to the frame at the sides thereof, the shaft or axle journaled in the hangers and having the carrying-wheels, the standard secured at one end of the frame and provided with the caster-wheel, and the rod or bar secured to the frame and axle thereof, and having the hook or claw at its outer free end, which is extended beyond the opposite end of the frame to the handles and the caster-wheel, substantially as herein described, for the purpose set forth.

In testimony that I claim the foregoing as my own I have hereto affixed my signature in presence of two witnesses.

WILLIAM PRESTON WILLIAMS.

Witnesses:
E. F. KELLEY,
GUS. A. NORMAR.